(12) United States Patent
Broghammer et al.

(10) Patent No.: US 6,714,256 B2
(45) Date of Patent: Mar. 30, 2004

(54) VIDEO SIGNAL PROCESSING SYSTEM

(75) Inventors: Bernd Broghammer, Tennenbronn (DE); Karl Buehler, Bad Duerrheim (DE); Guenther Huber, Bad Duerrheim (DE); Michael Maier, Villingen-Schwenningen (DE); Gerd Mauthe, Hausen o.V. (DE); Thomas Sagcob, Donaueschingen (DE); Juergen Vogel, Brigachtal (DE)

(73) Assignee: Harman Becker Automotive Systems GmbH, Villingen-Schwenningen (DE)

( * ) Notice: Subject to any disclaimer, the term of this patent is extended or adjusted under 35 U.S.C. 154(b) by 262 days.

(21) Appl. No.: 09/748,737

(22) Filed: Dec. 26, 2000

(65) Prior Publication Data

US 2001/0017669 A1 Aug. 30, 2001

(30) Foreign Application Priority Data

Dec. 23, 1999 (DE) .......................... 199 62 730

(51) Int. Cl.⁷ .............................. H04N 9/74; H04N 9/76
(52) U.S. Cl. ...................... 348/584; 348/448; 348/589; 348/598; 348/659; 345/546; 345/547; 345/629; 345/660
(58) Field of Search ................. 348/584, 589, 348/598, 600, 659, 443, 448, 454, 458, 564, 567; 345/546, 547, 629, 660, 663; H04N 9/74, 9/76

(56) References Cited

U.S. PATENT DOCUMENTS

| 5,469,223 A | * | 11/1995 | Kimura | 348/581 |
|---|---|---|---|---|
| 5,473,382 A | * | 12/1995 | Nohmi et al. | 348/448 |
| 5,517,253 A | * | 5/1996 | De Lange | 348/513 |
| 5,587,742 A | * | 12/1996 | Hau et al. | 348/441 |
| 5,912,710 A | * | 6/1999 | Fujimoto | 348/445 |
| 6,014,125 A | * | 1/2000 | Herbert | 345/660 |
| 6,023,262 A | * | 2/2000 | Eglit | 345/667 |
| 6,064,437 A | * | 5/2000 | Phan et al. | 348/446 |
| 6,064,450 A | * | 5/2000 | Canfield et al. | 375/240.29 |
| 6,256,068 B1 | * | 7/2001 | Takada et al. | 348/441 |
| 6,275,267 B1 | * | 8/2001 | Kobayashi | 348/555 |
| 6,411,333 B1 | * | 6/2002 | Auld et al. | 348/441 |
| 6,542,196 B1 | * | 4/2003 | Watkins | 348/448 |

FOREIGN PATENT DOCUMENTS

| EP | 0 422 729 A1 | 4/1991 |
|---|---|---|
| EP | 0 651 571 A2 | 5/1995 |
| WO | WO 97/04401 | 2/1997 |

OTHER PUBLICATIONS

Peter H. N. de With et al. "A Video Display Processing Platform for Future TV Concepts," *IEEE Transactions on Consumer Electronics*, vol. 45, No. 4, Nov. 1999, pp. 1230–1240.

Egbert G. T. Jaspers et al. "Chip–Set for Video Display of Multimedia Information," *IEEE Transactions on Consumer Electronics*, vol. 45, No. 3, Aug. 1999, pp. 706–715.

* cited by examiner

*Primary Examiner*—John Miller
*Assistant Examiner*—Brian P. Yenke
(74) *Attorney, Agent, or Firm*—Gauthier & Connors LLP

(57) ABSTRACT

A video signal processing system for processing a video data $V_{IN}$ and graphic data $D_{\mu P}$ includes a filter unit, which receives the video data $V_{IN}$. The filter unit filters the video data $V_{IN}$ to convert the video data $V_{IN}$ into video pictures formated with a different number of columns and/or lines, and provides a filtered video signal indicative thereof. The filter unit buffers individual pixels and/or lines in a first memory device. A second memory device receives and stores the graphic data $D_{\mu P}$ and the filtered video signal and provides stored signals indicative thereof. A third memory device is connected to the second memory, and stores data received from the second memory device. A mixing unit receives and mixes the stored graphic data and the stored filtered video data to provide a video output signal $V_{OUT}$.

18 Claims, 1 Drawing Sheet

VIDEO SIGNAL PROCESSING SYSTEM

BACKGROUND OF THE INVENTION

The invention relates to a video signal processing system, and in particular to a system for processing both video data and graphic data to provide a mixed output signal.

Video signal processing systems often include a filter unit that converts video pictures from a first format to a second format. For example, the first format may be coded in accordance with the digital studio standard of the International Telecommunications Union UIT-R (or of the Comite Consultatif International des Radiocommunications: CCIR) 601. An example of converting from a first format to a second format is the conversion from a PAL 16×9 picture format with 720 pixels per line (P/L) and 576 lines (L), into the National Television System Committee (NTSC) 16×9 picture format, with 480 pixels per line and 480 lines.

In addition, video signal processing systems often include a computing unit for mixing video and graphic pictures (e.g., layering and alpha-blending). The computing unit for mixing may weight different pictures by adjustable factors (i.e., alpha blending), so that transparent pictures can be displayed by combining and superposing the images (i.e., layering). For example, transparent buttons may be inserted while the original video picture continues to be visible in the background.

At this time, such systems exist only as individual components. A disadvantage of combining such systems is the amount of memory required to filter and mix video and graphic pictures.

Therefore, there is a need for a memory efficient video signal processing system capable of converting video signals from a first format to second format, and mixing several pictures.

SUMMARY OF THE INVENTION

Briefly, according to an aspect of the present invention, a video signal processing system for processing a video data $V_{IN}$ and graphic data $D_{\mu P}$ includes a filter unit, which receives the video data $V_{IN}$. The filter unit filters the video data $V_{IN}$ to convert the video data $V_{IN}$ into video pictures formated with a different number of columns and/or lines, and provides a filtered video signal indicative thereof. The filter unit buffers individual pixels and/or lines in a first memory device. A second memory device receives and stores the graphic data $D_{\mu P}$ and the filtered video signal and provides stored signals indicative thereof. A third memory device is connected to the second memory, and stores data received from the second memory device. A mixing unit receives and mixes the stored graphic data and the stored filtered video data to provide a video output signal $V_{OUT}$.

In one embodiment, the video signal processing system may be implemented with a programmable logic module (e.g., a FPCA) and additional memory units. For example, the first and third memories may be implemented as RAM external to the programmable logic module, while the second memory is located on the programmable logic module and configured as a cache to provide fast access. The remaining components of the video signal processing system may be located on the programmable logic module.

The graphic data may include bitmaps that are provided by a microprocessor. In this way, for example, transparent buttons may be inserted, while the original video picture associated with the video data continues to be visible in the background.

The system may also include a controller that controls the processing of the video and graphic signals, and specifically the programmable logic module and the memory components. The controller may be located within the programmable logic module. The controller may include a microprocessor, or receive instructions from an external microprocessor. The microprocessor may control parts of the program execution or the entire execution of the digital video signal processing program.

The video signal processing system preferably operates in real time.

In an alternative embodiment, the video signal processing system for processing a video data $V_{IN}$ and graphic data $D_{\mu P}$, comprising a horizontal filter that receives the a video data $V_{IN}$ and converts the video data $V_{IN}$ into video pictures formatted with a different number of columns, and provides a horizontally filtered video signal indicative thereof, wherein the horizontal filter buffers individual pixels and/or lines in a first memory device. A second memory device receives and stores the graphic data $D_{\mu P}$ and the filtered video signal, and provides stored signals indicative thereof. A third memory device is connected to the second memory, and stores data received from the second memory device. A mixing and filtering unit receives the stored graphic data and the stored horizontally filtered video data, and vertically filters the stored horizontally filtered video data to convert the video data into video pictures with a different number of lines. The mixing and filtering unit provides a vertically filtered signal indicative thereof and mixes the stored graphic data with the vertically filtered video signal to provide a video output signal $V_{OUT}$.

Significanlty, in this alternative embodiment, the vertical filter is no longer implemented at the input in the filter block, but at the output of the so-called layering block. This makes an additional filter block memory at the signal/video signal input unnecessary since the additional existing memory can be used at the same time.

In a preferred embodiment, the first memory is configured as a fast cache memory and the second memory as working memory in the form of a random access memory.

The system of the present invention may be used for an interlace progressive conversion. This is needed for future displays with higher resolution. In principle, the same saving applies there, mainly of a CPU, which is situated directly before the vertical filter of the first arrangement, and of an external memory. The memory saving in this case is even much greater, since the previous technique requires an additional half-picture memory for the corresponding signal processing. For example, in the case of the PAL standard, two lines must be interim stored in an external RAM. The second embodiment described herein may perform the interlace progressive version with the existing CPU and memory.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
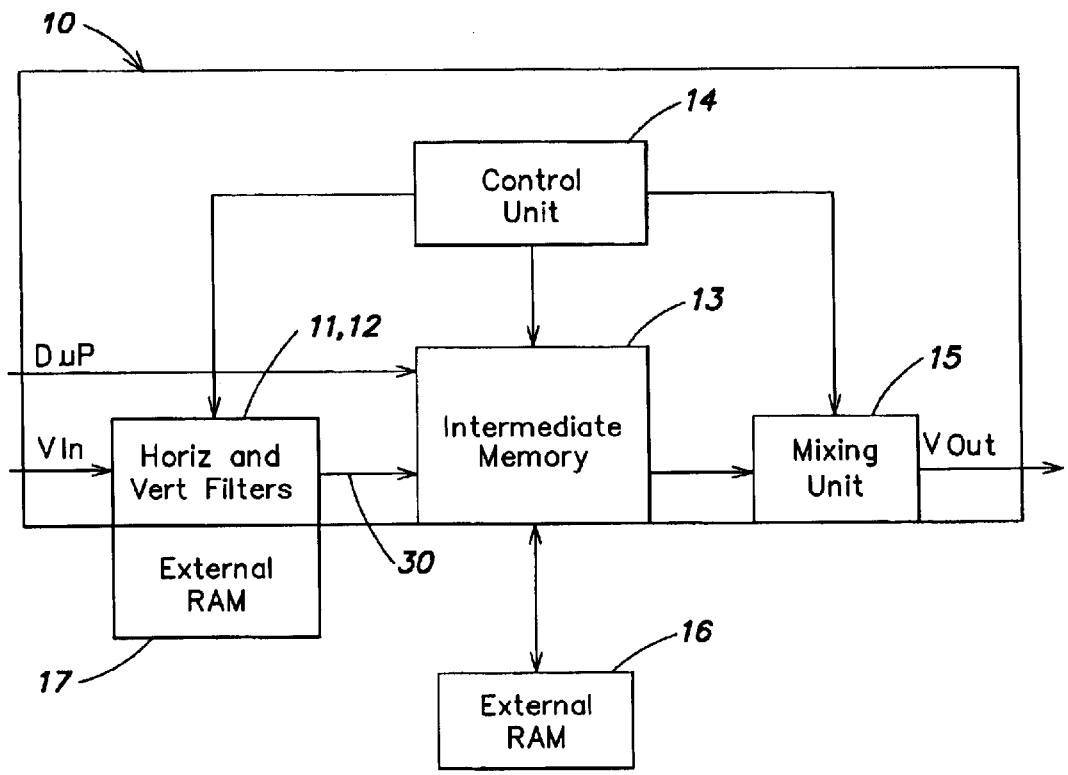
FIG. 1 is a block diagram illustration of a first embodiment of a video signal processing system.

FIG. 1 is a block diagram illustration of a first embodiment of a video signal processing system, which receives a video signal input $V_{IN}$, and a graphic input signal $D_{\mu P}$. The video signal input $V_{IN}$ is connected to a filter unit that includes a horizontal filter 11 and a vertical filter 12. An external memory 17 (preferably RAM) is associated with the filter unit. The filter unit provides a filtered video signal on a line 30 to an intermediate memory 13, which also receives the graphic input signal $D_{\mu P}$. The intermediate memory 13 is connected to another external memory 16.

The intermediate memory 13 is also connected to a mixing unit 15, which provides a video output signal $V_{OUT}$. A control unit 14 controls the filter unit (i.e., the horizontal filter 11 and the vertical filter 12) the memories 13, 16, and 17, and the mixing unit 15. In a preferred embodiment, the horizontal filter 11, vertical filter 12, intermediate memory 13 (cache), mixing unit 15, and control system 14 are integrated into a programmable logic module (e.g., a FPGA).

The digital video data of the video input signal $V_{IN}$ are scaled by the horizontal filter 11 and the vertical filter 12 (e.g., the data are converted into another size relationship to match a display device). For horizontal filtering, generally only a few pixels from the same line are needed. Since these succeed one another directly in time, only one memory is typically required for a few pixels. However, in the vertical filter 12, the pixels of several lines (e.g., of at least two lines) must be calculated together. Thus the information of at least one line must be buffered in a memory device. This buffering requires a memory size of at least 710 pixels for the luminous density signal and of at least 360 pixels for each color difference signal. Accordingly, a total of 1440 pixels (i.e., 720 pixels+(2×360) pixels) have to be stored.

The data are then written via the intermediate memory 13 (e.g., a cache), into an external memory 16 (e.g., RAM). In parallel with this, the graphic data (e.g., bitmaps) for example from a microprocessor (not shown), are written via the fast intermediate memory 13 into the external memory 16.

These pictures are combined with one another in the mixing unit 15 (layering block). This is done in such a way that different pictures are calculated together by an adjustable factor, for example, using a technique often referred to as alpha-blending. The result is transparent pictures that are presented for display on a display device (e.g., a CRT or flat panel display).

The system 10 is preferably operated in real time, which requires that the clock rate of the control system 14 be much higher than the clock rate of the input and output signal.

Figure 2:
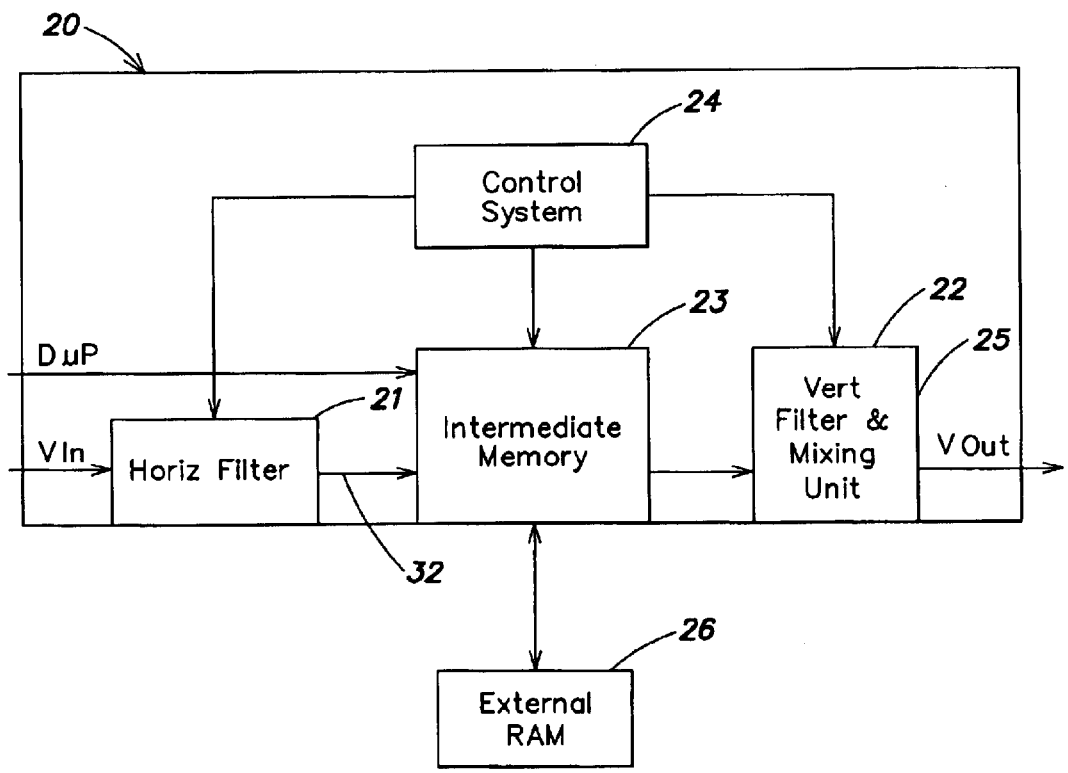
FIG. 2 is a block digram illustration of a second embodiment of a video signal processing system.

FIG. 2 is a block digram illustration of an alternative embodiment video signal processing system. The system of FIG. 2 receives and processes the video input signal $V_{IN}$, and the graphic input signal $D_{\mu P}$. Specifically, the video input signal $V_{IN}$ is input to a horizontal filter 21 that provides a horizontal filtered signal on a line 32. The graphic input signal $D_{\mu P}$ and the horizontal filtered signal on the line 32 are input to an intermediate memory 23. Similar to the first embodiment set forth in FIG. 1, the intermediate memory 23 is connected to an external memory 26. Furthermore, the intermediate memory 23 is connected to a mixing unit 25 and a vertical filter 22, which are preferably realized in one block as a mixing and filtering unit. The mixing and filtering unit provides a video output signal $V_{OUT}$. The components (i.e., the horizontal filter, intermediate memory 23, external memory 26, and the mixing and filter units 22 and 25) are connected via control lines to a control system 24. The control system 24, as well as all the other components except the external memory 26, are preferably integrated into a programmable logic module 20 (e.g., a FPGA).

In the embodiment illustrated in FIG. 2, the vertical filter 22 is located at the output of the mixing unit 25 (i.e., layering block), rather than at the input of the filter block as illustrated in FIG. 1. Significantly, in the embodiment illustrated in FIG. 2, the external memory 17 is omitted from the filter block since the existing external memory 26 (RAM) may be used at the same time.

The hardware of the mixing unit 25 (layering CPU) may be identical to that of the first embodiment. Only the control unit 24 now manages the correct calculation of the output data through an appropriately modified program execution. The integrated use of the mixing unit 25 (layering CPU) for vertical filtering is dynamically controlled by the control system 24 and/or by external instructions from a microprocessor.

This utilizes the higher clock rate of the CPU as compared to the clock rate of the input and output data. This also makes it possible for the various picture data, which are to be recalculated, to be read out quickly from the external memory 26 without damaging their bandwidth. In comparison to the first embodiment, the processing resources for the vertical filter 11 and the additional external memory 17 are also saved.

If this configuration is used for interlace progressive conversion, the memory saving is even greater. With interlace progressive conversion, a full picture with 576 lines is calculated by the vertical filter 22 from two half pictures, each with 288 lines. In this case, therefore, it must be possible to put a half picture, i.e. 288 lines, into intermediate storage. In the arrangement 1 illustrated in FIG. 1, this must be possible both in the external memory 17 and in the external memory 16. In the arrangement illustrated in FIG. 2, it is sufficient to buffer in the external memory 26.

In this arrangement the video data associated with the video input signal VIN are converted by the horizontal filter 21 into a video picture with a different number of columns. For this, about 5–6 pixels are be buffered in the external memory 26. The recalculated video data, together with the graphic data conducted over the graphic input signal $D_{\mu P}$, are written via the intermediate memory 23 into the external memory 26. To superpose two pictures using the mixing unit 25, the video data of a complete full picture (and the graphic data) must be stored. Consequently, it is desirable if both the mixing and vertical filtering are performed in a single block of the mixing and filtering device 22, 25.

Although the present invention has been shown and described with respect to several preferred embodiments thereof, various changes, omissions and additions to the form and detail thereof, may be made therein, without departing from the spirit and scope of the invention.

What is claimed is:

1. A video signal processing system for processing a video data $V_{IN}$ and graphic data $D_{\mu P}$, comprising:
   a) a filter unit, which receives the video data $V_{IN}$, and horizontally and vertically filters the video data $V_{IN}$ to convert the video data $V_{IN}$ into video pictures formated with a different number of columns and/or lines, and provides a filtered video signal indicative thereof, wherein said filter unit buffers individual pixels and/or lines in a first memory device;
   b) a second memory device that receives and stores the graphic data $D_{\mu P}$ and said filtered video signal and provides stored signals indicative thereof;
   c) a third memory device that is connected to said second memory, and stores data received from said second memory devices; and d) a mixing unit that receives and mixes said stored graphic data and said stored filtered video data to provide a video output signal $V_{OUT}$.

2. The video signal processing system of claim 1, wherein said first memory device comprises random access memory.

3. The video signal processing system of claim 1, wherein said second memory is configured as fast cache memory.

4. The video signal processing system of claim 3, wherein said third memory device comprises random access memory.

5. The video signal processing system of claim 2, wherein said graphic data $D_{\mu P}$ comprises bitmaps received from a microprocessor.

6. The video signal processing system of claim 2, comprising:
a controller that controls said filter unit, said first, second and third memories and said mixing unit to control the processing of said video signal procesing system.

7. The video signal processing system of claim 6, wherein said video signal processing system operates in real time with the clock frequency of said controller being higher than the clock frequency of the signal associated with the video data $V_{IN}$ and said video output signal $V_{OUT}$.

8. The video signal processing system of claim 6, wherein said controller comprises a microprocessor.

9. A video signal processing system for processing a video data $V_{IN}$ and graphic data $D_{\mu P}$, comprising:
a) a horizontal filter that receives the video data $V_{IN}$ and converts the video data $V_{IN}$ into video pictures formatted with a different number of columns, and provides a horizontally filtered video signal indicative thereof, wherein said horizontal filter buffers individual pixels and/or lines in a first memory device;
b) a second memory device that receives and stores the graphic data $D_{\mu P}$ and said horizontal filtered video signal and provides stored signals indicative thereof;
c) a third memory device that is connected to said second memory, and stores data received from said second memory device; and
d) a mixing and filtering unit that receives said stored graphic data and said stored horizontally filtered video data, vertically filters said stored horizontally filtered video data to convert the video data into video pictures with a different number of lines and provide a vertically filtered signal indicative thereof, and mixes said stored graphic data with said vertically filtered video signal to provide a video output signal $V_{OUT}$.

10. The video signal processing system of claim 9, wherein said second memory device is configured as a fast cache memory.

11. The video signal processing system of claim 10, wherein said third memory device comprises random access memory.

12. The video signal processing system of claim 10, wherein the graphic data comprises bitmaps received from a microprocessor.

13. The video signal processing system of claim 10, comprising:
a controller that controls said horizontal filter, said first, second and third memories and said mixing unit to control the processing of said video signal procesing system.

14. The video signal processing system of claim 13, wherein the clock frequency of said controller is higher than the clock frequency of a signal at the video input signal $V_{IN}$ and said video output signal $V_{OUT}$.

15. The video signal processing system of claim 14, wherein said controller comprises a microprocessor.

16. The video signal processing system of claim 15, wherein said video signal processing system is used for interlace progressive conversion.

17. A video signal processing system for processing a video data $V_{IN}$ and graphic data $D_{\mu P}$, comprising:
a filter unit, which receives the video data $V_{IN}$ and horizontally and vertically filters the video data $V_{IN}$ to convert the video data $V_{IN}$ into video pictures formated with a different number of columns and/or lines, and provides a filtered video signal indicative thereof, wherein said filter unit buffers individual pixels and/or lines in a first memory device;
b) a second memory device that receives and stores the graphic data $D_{\mu P}$ and said filtered video signal and provides stored signals indicative thereof;
c) a third memory device that is connected to said second memory, and stores data received from said second memory devices; and
d) a mixing unit that receives and mixes said stored graphic data and said stored filtered video data to provide a video output signal $V_{OUT}$, which represents a superposition of said stored graphic data and said stored filtered video data.

18. A video signal processing system for processing a video data $V_{IN}$ and graphic data $D_{\mu P}$, comprising:
a) a horizontal filter that receives the video data $V_{IN}$ and converts the video data $V_{IN}$ into video pictures formated with a different number of columns, and provides a horizontally filtered video signal indicative thereof, wherein said horizontal filter buffers individual pixels and/or lines in a first memory device;
b) a second memory device that receives and stores the graphic data $D_{\mu P}$ and said filtered video signal and provides stored signals indicative thereof;
c) a third memory device that is connected to said second memory, and stores data received from said second memory device; and
d) a mixing and filtering unit that receives said stored graphic data and said stored horizontally filtered video data, vertically filters said stored horizontally filtered video data to convert the video data into video pictures with a different number of lines and provide a vertically filtered signal indicative thereof, and mixes said stored graphic data with said vertically filtered video signal to provide a video output signal $V_{OUT}$.

* * * * *

UNITED STATES PATENT AND TRADEMARK OFFICE
CERTIFICATE OF CORRECTION

PATENT NO. : 6,714,256 B2
DATED : March 30, 2004
INVENTOR(S) : Broghammer et al.

It is certified that error appears in the above-identified patent and that said Letters Patent is hereby corrected as shown below:

Column 1,
Line 56, should read -- (e.g., a FPGA) and... --

Column 4,
Line 30, should read -- ...In the arrangement illustrated ... --

Signed and Sealed this

Thirteenth Day of July, 2004

JON W. DUDAS
*Acting Director of the United States Patent and Trademark Office*